Dec. 1, 1931.  J. S. C. MARSHALL ET AL  1,834,628
LIQUID MEASURING DEVICE
Filed Oct. 1, 1928
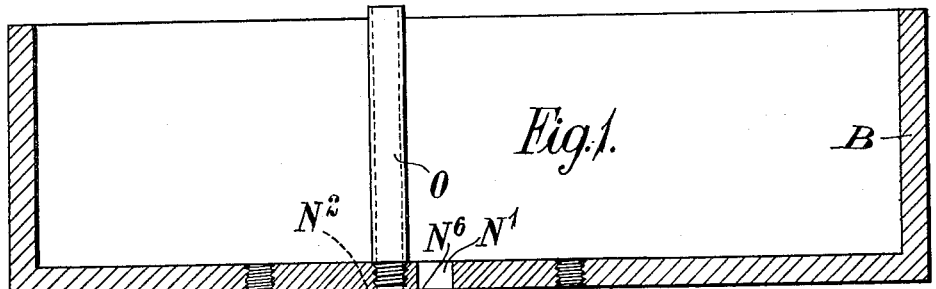
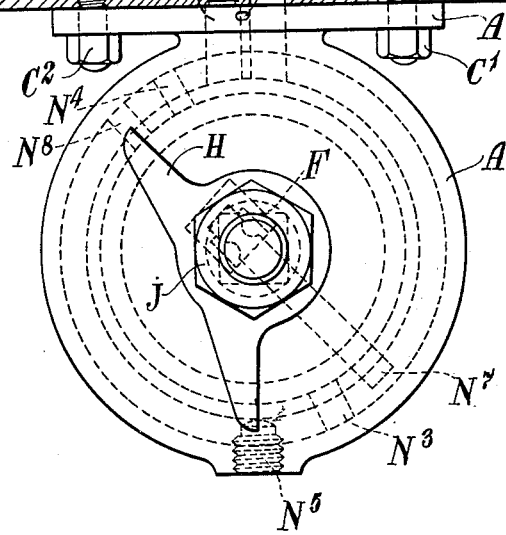
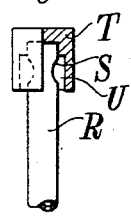
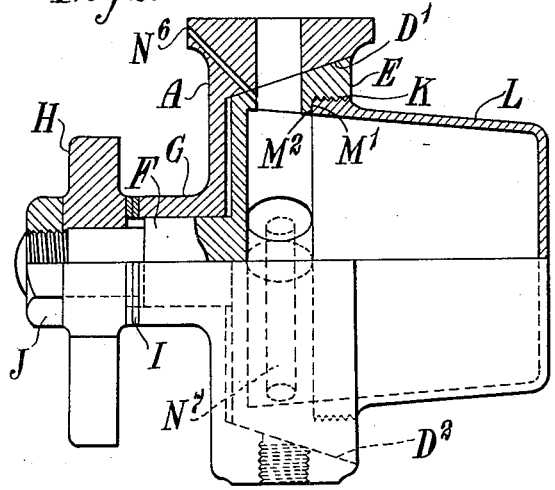
Inventors:
John Simeon Clayton Marshall
and George Simeon Clayton
By
Attorney Patented Dec. 1, 1931

1,834,628

UNITED STATES PATENT OFFICE

JOHN SIMEON CLAYTON MARSHALL AND GEORGE SIMEON CLAYTON, OF LONDON, ENGLAND

LIQUID MEASURING DEVICE

Application filed October 1, 1928, Serial No. 309,499, and in Great Britain October 1, 1927.

Our invention relates to apparatus for delivering liquids such as milk in measured quantities for filling bottles or like containers.

More particularly the invention relates to that kind of apparatus in which a measuring container situated below a vessel containing the liquid is adapted to be moved, so that openings in the container alternately register with an inlet passage extending to the bottom of the vessel and an outlet passage extending to the bottle or like container to be filled. Previously such measuring containers have been used in conjunction with bottles or like closed vessels so that the quantity of liquid which could be measured out has been strictly limited to the capacity of the vessel.

The invention broadly consists of a measuring container which is adapted to be readily affixed to the bottom of a pan or like open vessel in which milk can be poured freely so that the quantity of milk which can be measured out is unlimited, and according to one feature of the invention there are two passages extending from the container to the pan, one with an extension piece reaching above the level of the liquid and serving as an outlet for the escape of air as milk is admitted to the container through the other passage.

According to a subsidiary feature of the invention the measuring container consists of two portions, a shallow portion in which the inlet and outlet openings are located, and a cup-shaped portion which is readily detachable. By this means the shallow part, which is normally fixed to the bottom of the pan, can be readily cleaned, while the deep cup-shaped portion can be removed and taken away for cleaning.

According to a further feature of the invention an arrangement is provided by which the quantity to be delivered from the measuring container which is affixed to the bottom of a pan or like open vessel can be reduced to any desired amount and yet each quantity delivered will be of standard measure, without necessitating the substitution of different sized end covers as has been previously proposed; for instance, in milk bottling where it is desirable to fill bottles with pints or with half-pints of milk, and according to this feature, by fitting in the outlet opening of the container a tube having a siphon fitted at the upper end. The amount of milk to be delivered can be set to exactly one half the capacity of the container. Other proportions could be adjusted if required as will be readily understood by those versed in the art.

The invention will be better understood by referring to the accompanying drawings which illustrate one way of carrying the invention into effect, although it will be understood that modifications can be made in the constructional details without departing from the spirit of the invention.

Referring to the drawings:

Figure 1 is a front elevation of the measuring container and housing therefor, part of the pan being shown in section, Fig. 2 is a half-sectional side elevation, and Fig. 3 shows an interior detail.

The device consists of an outer housing A which is secured to the underside of a supply pan or vessel B by studs and nuts C1, C2. In one face of housing A is turned a conical recess D1, D2. Into this conical recess D1, D2 is fitted a circular member E, which is machined and ground on one face D1, D2 to form a liquid-tight joint.

This part E is also centrally supported in the housing A by the internal spindle F which passes through a boss G. Flats are formed on the spindle F to form a square over which a handle or cam H is placed. Spindle F is extended beyond the flats and there threaded to receive a nut J and spring washer I between boss G and lever H. As nut J is tightened, spring washer I draws portion E snugly into housing A, making a tight joint at D1, D2, but permitting portion E to be revolved in housing A.

The inner circumference of the member E is threaded at K, and a cup L is screwed thereinto so that a liquid-tight joint is made on faces M1, M2. These faces are squared true, so that in addition to making a liquid-tight joint, provided the parts are screwed home, the capacity of the container is always constant. The remaining inner circumference of portion E is bored out to the same taper as cup L internally, so that when E and L are together, the taper is continuous.

From the supply pan B and through the circular portion E the holes N1, N2 are drilled to form a liquid inlet port N1 and an air outlet port N2. The portion of air outlet port N2 through supply pan B is tapped and has inserted in it a tube O which is of sufficient length to allow the air to escape above the level of liquid in the supply pan B, thereby ensuring that the inner portion of the apparatus is full of liquid. A port N3 is drilled through circular portion E at the position indicated, and a port N4 is drilled through said portion E diagonally opposite port N3. At the bottom of the outer housing A a boss is formed, through which a port N5 is drilled, said port being tapped to receive an outlet nozzle (not shown). A port N6 is drilled through housing A. When required to function, the parts of the apparatus first take up position as shown in Fig. 1, with ports N1 and N2, which are in line with holes in the bottom B of the supply pan, registering with openings in the part E, and the liquid flows through port N1 into cup L, displacing air through port N2. When the cup L is full, the members F, E and L are rotated by the cam or lever H sufficiently to bring ports N3 and N4 into line with outlet port N5 and air vent N6 respectively, allowing the liquid to flow through the outlet nozzle screwed into outlet port N5. Vents N4 and N6, being in line, admit air to cup L as liquid is delivered. As the ports N1 and N2 are closed by face D1 before ports N3 and N5 lap, a definite quantity of liquid is trapped in the completely filled head.

The cup L can be replaced by larger or smaller cups according to the quantities of liquid required to be separated and delivered, as is known. The quantity of liquid delivered can, however, according to the invention, be varied by the addition of a port N7 drilled through portion E as indicated in Fig. 1, into which is fitted a tube R having holes S drilled towards the top as shown in Fig. 3. Over the tube R is fitted a cap T with an internal annular space U round tube R forming a siphon when the cup L commences to empty. With outlet N7 in line with outlet N5, the flow automatically stops when the siphon is broken as the level of the liquid drops to the bottom edge of the cap T. An air vent N8 drilled diagonally opposite port N7 admits air to cup L as liquid is delivered. The height of the bottom edge of the cap T can be varied, either by substituting a different cap for the cap T, or by making the cap such that it can be slid up or down the tube R, to give deliveries of portion of the contents of the cup L as required. The addition of this attachment R and T enables two definite quantities to be delivered without changing the cup L.

The whole apparatus is capable of being quickly dismantled for cleaning. The quantity delivered is practically unaffected by wear of the moving parts.

We claim as our invention:—

1. Apparatus for delivering liquid in measured quantities, comprising an open pan-like supply vessel into which liquid can readily be poured as required having a liquid passage and an air passage extending through its bottom wall; a movable measuring container situated immediately below said vessel and provided with two openings in its upper side adapted, in one position of the container, to register with both passages, said container having also associated with it a discharge outlet which is open when the container occupies another position; and a tube disposed within the container for registration at one end with said outlet in still another position of the container, said tube having its other end perforated and provided with a cap which embraces the perforations and the interior diameter of which is such as to permit free passage of liquid to said perforations, the lower edge of the cap determining the amount of liquid to be delivered.

2. Apparatus according to claim 1, in which the container has two separate outlet ports, both of which cooperate with the discharge outlet and in one of which the siphon tube is fitted, the other port adapted to register directly with said outlet in a position of the container where the siphon tube is out of use.

3. Apparatus for delivering liquid in measured quantities, comprising an open pan-like supply vessel into which liquid can readily be poured as required having a liquid passage and an air passage extending through its bottom wall; a movable measuring container situated immediately below said vessel and provided with two openings in its upper side adapted, in one position of the container, to register with both passages; said container having also associated with it a discharge outlet which is open when the container occupies another position; an air tube fitted in the air passage and disposed within the confines of the vessel, said tube extending above the level of the liquid in said vessel to permit the free escape of air from the container during the admission of liquid thereinto from the vessel through the other passage; and another tube provided with a siphon attachment at one end mounted within the container for registration with the outlet when the container occupies still another position, to enable the delivery of liquid in quantities of another given measure.

4. Apparatus for delivering liquid in measured quantities, comprising a supply vessel adapted to hold the liquid to be measured, said vessel having a liquid passage and an air passage; and a movable measuring container provided with two openings adapted in one position of the container to register with the passages in the holding vessel and another outlet which is open when the container is in another position, a portion of the container being detachable from the remainder of the container to permit substitution of a larger or smaller measuring device.

5. Apparatus for delivering liquid in measured quantities, comprising an open pan-like supply vessel having a liquid passage and an air passage in its bottom wall; a movable measurng container below said vessel and provided with two openings, adapted in the filling position of the container to register with both passages, said container having a discharge outlet for the liquid and an inlet for air which are operative when it is in a discharging position; and means for preventing the passage of liquid from the passages of the supply vessel into the container when the container is discharging.

JOHN SIMEON CLAYTON MARSHALL.
GEO. S. CLAYTON.